United States Patent
Albert et al.

(10) Patent No.: US 9,222,004 B2
(45) Date of Patent: Dec. 29, 2015

(54) INTRUSION RESISTANT THERMAL LAMINATING FILM

(71) Applicant: TRANSILWRAP COMPANY, INC., Franklin Park, IL (US)

(72) Inventors: Timothy W. Albert, Dayton, OH (US); Robert C. Flaherty, Loves Park, IL (US)

(73) Assignee: Transilwrap Company, Inc., Franklin Park, IL (US)

( * ) Notice: Subject to any disclaimer, the term of this patent is extended or adjusted under 35 U.S.C. 154(b) by 0 days.

(21) Appl. No.: 14/502,548

(22) Filed: Sep. 30, 2014

(65) Prior Publication Data

US 2015/0024197 A1 Jan. 22, 2015

Related U.S. Application Data

(63) Continuation of application No. 12/064,278, filed as application No. PCT/US2006/034061 on Aug. 31, 2006, now Pat. No. 8,852,738.

(60) Provisional application No. 60/712,805, filed on Aug. 31, 2005.

(51) Int. Cl.
*B32B 7/12* (2006.01)
*C09J 7/02* (2006.01)
*B32B 27/08* (2006.01)
*C09J 123/06* (2006.01)
*C09J 133/02* (2006.01)
*C09J 133/08* (2006.01)
*C09J 123/26* (2006.01)

(52) U.S. Cl.
CPC .............. *C09J 7/0242* (2013.01); *B32B 27/08* (2013.01); *C09J 7/0285* (2013.01); *C09J 123/06* (2013.01); *C09J 123/26* (2013.01); *C09J 133/02* (2013.01); *C09J 133/08* (2013.01); *C09J 2201/122* (2013.01); *C09J 2201/61* (2013.01); *C09J 2201/622* (2013.01); *C09J 2203/338* (2013.01); *C09J 2205/114* (2013.01); *C09J 2423/00* (2013.01); *C09J 2423/04* (2013.01); *C09J 2433/00* (2013.01); *C09J 2467/006* (2013.01); *Y10S 428/915* (2013.01); *Y10S 428/916* (2013.01); *Y10T 428/28* (2015.01); *Y10T 428/2813* (2015.01); *Y10T 428/2817* (2015.01); *Y10T 428/2826* (2015.01); *Y10T 428/2852* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 3,742,088 A | 6/1973 | Garver, Sr. | |
| 4,146,521 A | 3/1979 | Godfrey | |
| 4,390,668 A | 6/1983 | Garver, Sr. | |
| 4,452,942 A | 6/1984 | Shida et al. | |
| 4,543,099 A | 9/1985 | Bunnelle et al. | |
| 4,631,308 A | 12/1986 | Graham et al. | |
| 5,312,714 A | 5/1994 | Ogawa | |
| 5,890,742 A * | 4/1999 | Waller | 283/67 |
| 6,042,930 A | 3/2000 | Kelch et al. | |
| 6,329,465 B1 * | 12/2001 | Takahashi et al. | 525/191 |
| 8,541,073 B2 * | 9/2013 | Kendig et al. | 428/34.1 |
| 8,852,738 B2 * | 10/2014 | Albert et al. | 428/355 R |
| 2004/0188996 A1 * | 9/2004 | Nitta et al. | 283/72 |
| 2004/0209097 A1 | 10/2004 | Willham et al. | |
| 2008/0318040 A1 * | 12/2008 | Albert et al. | 428/355 AC |
| 2009/0068456 A1 * | 3/2009 | Masuda et al. | 428/347 |
| 2009/0208765 A1 * | 8/2009 | McGee et al. | 428/482 |

OTHER PUBLICATIONS

Where do polymer adhesives fail?, Europhysics Letters, 48(2) pp. 150-155 (Oct. 15, 1999).
American National Standard, Developed by INCITS, Where IT all begins, ANSI INCITS 322-2008, Revision of ANSI INCITS 322-2002 (2002, revised 2008).
The Smithsonian/NASA Astrophysics Data System, Adhesive vs. Cohesive Failure in Polymer Adhesives, Mar. 17-21, 1997.
PRIMACOR 3003 Copolymer datasheet, The Dow Chemical Company, circa 2005.
Dow AMPLIFY EA 101 Ethylene-ethyl Acetate (EEA) datasheet, circa 2005.
Reference: Polymer Properties, Thermal Transitions of Homopolymers: Glass Transition & Melting Point, Polymer Products by Aldrich, circa 2005.
International Search Report and Written Opinion in PCT/US06/34061, dated Jan. 24, 2007.
International Preliminary Report on Patentability in PCT/US2006/034061, dated Mar. 13, 2008.

\* cited by examiner

*Primary Examiner* — Hai Vo
*Assistant Examiner* — Anish Desai
(74) *Attorney, Agent, or Firm* — Cook Alex Ltd.

(57) ABSTRACT

A thermal laminating film is provided that has superior intrusion resistance that is well suited to addressing security and anti-counterfeiting needs. The film includes a polymer substrate and an adhesive system with a polymer component having a Vicat softening point temperature that is close to a glass transition temperature of the polymeric substrate, which typically is not greater than about 95° C.

15 Claims, No Drawings

INTRUSION RESISTANT THERMAL LAMINATING FILM

CROSS REFERENCE TO RELATED APPLICATION

This application claims the benefit of U.S. application Ser. No. 12/064,278, filed Feb. 20, 2008 (section 371(c) date of Jun. 5, 2008), now U.S. Pat. No. 8,852,738, which is a national stage of PCT/US2006/034061, filed Aug. 31, 2006, each of which claims priority from Provisional Application No. 60/712,805, filed Aug. 31, 2005, all hereby incorporated by reference hereinto.

TECHNICAL FIELD AND BACKGROUND

The security documents market strives to offer tamper-resistant ID cards and secure documents which cannot be forged or counterfeited and are of a multi-layered structure. In this market, there is a need to have an overlaminating film that has excellent adhesion to a variety of substrates including but not limited to photographs or heavy ink coverage on paper or plastic materials. In addition to a strong adhesive bond, the film needs to be tamper-resistant. A tamper-resistant film is defined herein as one which cannot be separated from the laminated document without destroying the multi-layered construction, rendering it open to data alteration. Once altered, a document having a film that is not tamper resistant would be able to be re-laminated by skilled counterfeiters using the same overlaminate structure complete with any additional security features.

One important secure document test is a hot plate intrusion test. This procedure attempts to simulate a counterfeiter who heats a laminated structure, pries the layers apart, alters the data, and then re-laminates the structure. During this procedure, a laminated piece (film laminated on both sides to TESLIN® synthetic printing sheet) is placed on a tightly temperature-controlled hot plate. The hot plate used for intrusion testing is sold by Torey Pines Scientific Model HP30A. TESLIN® sheet, available from PPG Industries, Inc., is a polyolefin-based printable porous and waterproof bright white synthetic printing sheet. This is a single-layer uncoated film.

In proceeding with the hot plate intrusion test, the laminated film pieces are heated to a point where the thermal adhesive softens and flows while the substrate remains rigid. A blade is used to help separate the layers. Most thermal laminating films will easily delaminate because the substrate is an oriented polyester terephthalate (OPET) with a high crystallinity. The adhesive becomes soft well before the substrate does, allowing for the separation of the two layers. In such a situation, there is a potential of separating the film without damaging the substrate, thereby facilitating counterfeiting.

We have determined that a property relevant to separation is the glass transition temperature of the substrate (namely, the glass transition temperature where the substrate begins to exhibit rubbery, flexible tendencies). We have further come to realize that polymers with too much crystallinity may have a glass transition point (the amorphous portions of the structure going through this change), but the polymer substrate may still remain rigid due to the remaining crystalline structure. In contrast, an amorphous polymer or a polymer with low crystallinity becomes pliable once the glass transition of the substrate is exceeded, and a clean separation which relies upon a rigid backing now fails. A crystalline or semi-crystalline polymer (common in film applications) will have a difficult time passing this hot plate intrusion test due to the rigidity remaining in the structure until the melting point, typically above about 300° F. (or above about 146° C.), is reached. A base substrate produced from an amorphous polymer (or polymer with a low crystallinity) will provide a more secure product.

An additional test that security laminations must pass was developed by Polaroid Identification Systems, currently Digimarc Identification Systems. In this test, often called the Polaroid environmental test, films are laminated to Teslin® synthetic printing sheet. The films are cut into CR80 sized (3.37 inch by 2.13 inch or about 8.6 cm by 5.4 cm) pieces or cards and placed into a pressure cooker with 225 mL of distilled water. The cards are not submerged in the water but elevated above it. The pressure cooker, with the cards inside, is placed into an oven at 160° F. (71° C.) and cooked for five days. At the end of the five days, exactly 15 cards are placed into a rust free paint can with 30 mL of distilled water and 20 grams of 120 grit sand. The paint can is sealed and shaken for three hours. The paint shaker used for the Polaroid environmental test is a Miller paint shaker Model G70. The pieces are removed and looked at for delamination. "Dog-eared" corners and delamination are unacceptable and considered failures. Rounded corners due to abrasion without delamination are acceptable. Other variants of this test may exist and be employed to simulate similar "severe" weathering conditions.

One other test of importance is the peel test measured using the following method. Two pieces of the coated film are cut to a size of 4.5 inches by 5.5 inches (11.5 cm by 14 cm) with the cut of 5.5 inches being parallel to the machine direction of the film. These two pieces then are sandwiched together with the adhesive inside the polymer film on the outside surfaces. The structure looks like the following from top to bottom: polymer film/adhesive//adhesive/polymer film. A piece of paper 1.25 inches by 5 inches (3.2 cm by 12.7 cm) is cut to be used as a separation tab. This is inserted along one end of the peel test sandwich parallel to the cut of 4.5 inches. The entire sandwich is placed within a silicone coated paper carrier and laminated through a standard pouch laminator. The laminator produces a temperature at the bond-line, the adhesive//adhesive interface, of 240° to 250° F. (115.5 to 121° C.), which is the ideal temperature at this stage of the peel test. For a product that is 0.020 inches (about 0.5 mm) in thickness (7/3//3/7) the laminator is set at 300° F. (146° C.). After lamination, test strips 1 inch by 5 inches are cut from the sample perpendicular to the paper insert.

These test strips are subjected to this peel test as follows. A Lloyd tensiometer is used to measure the force to separate the laminated pieces. After zeroing the test equipment, a strip is inserted into the jaws so that the jaws are gripping the paper tabs. Depressing the "GO" button will start separation of the jaws at a rate of 10 inches per minute. A load cell attached to the top jaw measures the force applied between the jaws, which is the force to destruct the sample. The average pull force is noted along with the mode of failure: adhesive (separation internal to the laminating film at the interface between the polymer film and the adhesive), cohesive (separation between the adhesive//adhesive interface), or tear (tear of the polymer film).

According to a variation of this peel test, a piece of 0.010 inch (about 0.25 mm) Teslin® polyolefin-based synthetic printing sheet (available from PPG) can be inserted between the coated pieces, which is usually how the product is used in the field. The test is conducted in the same manner, with the following exceptions: 1) the laminator is typically set at 350° F. (121° C.) to allow for the additional 10 mil (about 0.25 mm)

of thickness, and 2) the mode of failure could (and should) be Teslin® failure in the "Z" direction.

Even though the majority of secure documents are flush cut, i.e. there is no adhesive//adhesive bonding, this peel test demonstrates value in determining if the polymer film/adhesive interface is the weak link. A cohesive failure (adhesive// adhesive failure) is a preferred benchmark. This mode of failure requires destructive physical force at the adhesive// adhesive interface, demonstrating that a strong bond between the polymer film and adhesive exists.

A current approach in the security laminate market is supplied by Transilwrap and consists of an amorphous polycyclohexylenedimethylene terephthalate (PCTA, Eastman A-150 extruded at a thickness of 0.007 inch or about 0.18 mm by Pacur, LLC) substrate coated with a low density polyethylene (LDPE, AT Polymer 418, extruded at a thickness of 0.003 inch or about 0.076 mm) thermoplastic adhesive. This film may have other security features printed on the adhesive, such as UV-only visible security printing, color shifting security printing, Advantage™ security label, or other printed optical variable devices (OVD).

Concerning this current Transilwrap product, LDPE is not the most aggressive adhesive agent. Being a straight chain hydrocarbon, there is not much functionality that allows adequate adhesion to printed surfaces. Thus, corona treatment is used to add functionality (primarily carbon-oxygen single and double bonds) to the surface and increase the bonding potential of the adhesive. As print technology has advanced, simple corona treatment does not provide enough functionality for acceptable adhesion. Additionally, the saturated single bond chemistry often proves inadequate for suitable adhesion to the rigid substrate and fails with an adhesive failure mode.

Changes to LDPE technology have caused declining results in the Polaroid environmental test when using LDPE in this manner. These changes include a reduction in the level of unsaturation (carbon-carbon double bonds) in the polymer chains by manufacturers of LDPE such as Dupont, Equistar, and AT Polymers. Fine-tuning the ethylene resin to be more saturated for most end users is beneficial due to lowering instances of gels thus yielding a cleaner material. However, this in turn weakens its ability to be a strong adhesive. We have determined that this change has impacted the current Transilwrap LDPE coated product in two negative ways. First, by decreasing the level of unsaturation, the number of active bonding sites also is decreased since the unsaturated bonds are more readily oxidized by traditional corona treatment. Second, decreased adhesion to the PCTA substrate has been realized.

In typical manufacturing approaches, an optional primer layer is applied to the polyester film prior to extrusion coating. When primers are utilized, they can take the form of thin-layer, water-resistant primer material where the cards being assembled are to withstand exposure to moisture during use, for example. In general, the primer bonds best to unsaturated resins; whereas, the recent raw material trend has been to become more saturated, i.e. less unsaturated. For example, a slightly increased adhesion of the LDPE to the PCTA substrate is observed. Due to the unfavorable economics and the need in other markets to reduce the level of unsaturation of commodity-grade LDPE, this solution is not suitable.

Another product manufactured by Transilwrap is a PCTA substrate coated with a blend of ethyl ethyl acrylate copolymer (EEA) adhesives. This product has excellent bond strength to a variety of print technologies and has not seen the intermittent failures through the Polaroid environmental test of other products. However, the EEA resins have a softening point that is 35° C. lower than glass transition point of the PCTA. As discussed herein, and in keeping with the present invention, it has been determined that such a large difference between those respective temperatures is a primary reason why this product does not pass the hot plate intrusion testing. An important objective of the present invention is to make the two respective temperatures (softening point of the adhesive and glass transition temperature of the substrate) virtually one and the same.

SUMMARY

In an embodiment of the invention, a thermal laminated film is provided as a self-supporting polymeric substrate. The laminated film includes a thermal adhesive comprising a polymer having a Vicat softening point temperature close to the glass transition temperature of the polymeric substrate in this general temperature range. The thermal adhesive polymer typically has a melt flow index of about 15 MFI or less. In an embodiment, the substrate is an amorphous or low crystalline polymer having this glass transition temperature of not greater than about 95° C.

A general aspect or object is to provide an intrusion resistant laminated film that typically is prepared by thermal lamination.

Another aspect or object is to provide an intrusion resistant laminated film including a polymeric substrate and a thermal adhesive system wherein a glass transition temperature of the substrate roughly approximates the Vicat softening point of the thermal adhesive system such that this glass transition temperature is not greater than about 95° C. and this Vicat softening point is at least about 80° C.

Another aspect or object is to provide an intrusion resistant laminated film that passes intrusion resistance testing such as the hot plate intrusion test, the so called Polaroid environmental systems test, and the peel test as described herein.

Another aspect or object is to provide an intrusion resistant laminated film that passes intrusion resistance testing while formulating an adhesive system having a low melt flow index and Vicat softening point at or close to an amorphous or low crystallinity polymeric substrate glass transition temperature while maintaining excellent adhesion properties.

Other aspects, objects and advantages of the present invention, including the various features used in various combinations, will be understood from the following description according to preferred embodiments of the present invention, taken in conjunction with the drawings in which certain specific features are shown.

DETAILED DESCRIPTION

As required, detailed embodiments are disclosed herein; however, it is to be understood that the disclosed embodiments are merely exemplary, and may be embodied in various forms. Therefore, specific details disclosed herein are not to be interpreted as limiting, but merely as a basis for the claims and as a representative basis for teaching one skilled in the art to variously employ the present invention in virtually any appropriate manner.

A thermal laminating film comprised of a substrate coated with a thermal adhesive system exhibits a combination of high Vicat softening point (at or above 80° C., atypical for common thermal adhesives) and low melt flow index (at or below 15 MFI). The substrate is amorphous or has low crystallinity and has a glass transition point at or below 95° C. These two temperatures and the MFI of the adhesive system are in such a combination that when laminated to printed or unprinted synthetic printing sheet such as TESLIN® film, the total structure passes a hot plate intrusion test described herein. The adhesive system has an aggressive bond that will adhere to a variety of printed and non-printed substrates. The adhesive system has an aggressive bond to the base substrate upon which it is coated and once laminated forms the center layer of a strongly bonded multi-layer structure.

Most functional polymers that offer aggressive bond strength to a variety of print technologies typically have a softening point or glass transition temperature lower than 90° C. By selecting base substrates having a relatively low glass transition point, desirable film attributes such as rigidity and toughness will decrease. Therefore, when pursuing the approach of the present disclosure to provide a substrate glass transition temperature that is similar to the Vicat softening point temperature of the adhesive system, there is a problem in maintaining good functional attributes while achieving this objective of the invention for such multi-layer films. Base substrate rigidity and toughness are relatively low for base substrates that have a glass transition temperature low enough to more closely match the Vicat softening point of an appropriate adhesive. In the secure document market, the polymeric substrate that has been used, and which has an approximately 90° C. glass transition temperature, is near the lower limit of acceptability.

The substrate material is to be transparent and not hazy and is a thermoplastic polymer having a glass transition temperature within the range discussed herein. Included are polyesters that have limited crystallinity as noted herein. Examples of the films that can benefit from the approach described herein include polycyclohexylenedimethylene terephthalate (PCTA), an amorphous polyester that is glycol-modified polycyclohexylenedimethylene terephthalate (PCTg), glycol-modified polyethylene terephthalate (PETg), and other specialty polyesters. A typical substrate material will have a glass transition temperature of not greater than 100° C., typically not greater than 95° C., or not greater than 90° C., or not greater than 85° C.

For the adhesive system, aggressive adhesive chemistries are selected. They can start with a polyethylene backbone. They can be modified with various functional groups which reduce the melting point. However, as the softening point is increased, the adhesion characteristics are decreased. Increasing the density of a polyolefin for a thermal adhesive, such as going from low density polyethylene (LDPE) to medium density polyethylene (MDPE) to high density polyethylene (HDPE) to polypropylene (PP), increases the softening point. Polypropylene has a very high Vicat softening point (130° C.), but as an adhesive has proven inadequate through roll lamination. Modifying propylene resin with various functional resin blends does little to enhance the adhesion characteristics, which is believed to be due to interference from the base propylene polymer.

In keeping with the invention, the thermal adhesive system includes one or more adhesives having properties discussed herein. The adhesive system passes the intrusion resistance testing described herein as well as provides a strong bond to a variety of substrates. The approach for an adhesive system that facilitates achieving these objectives includes adhesive resin blends which include LDPE with functionality added to the LDPE chain while maintaining a Vicat softening temperature around 90° C. An example for an LDPE resin of this type is the "418" polymer of AT Polymers. Its physical properties include a Vicat softening point of 90° C. and a melt flow index (MFI) of 12 grams per ten minutes. Although not intending to be bound by any theory, it is currently understood that one should keep the Vicat softening point of a resin or resin blend as close as possible to such physical properties while maintaining or decreasing the MFI of the adhesive or adhesives. This is believed to render the adhesive less prone to intrusion when heated above the softening point.

Success in meeting these types of thermal adhesive system objectives at times can be achieved with a blend approach. For example, unlike more traditional laminating adhesives such as LDPE, an ethylene ethyl acrylate (EEA) adhesive system leaves a significant temperature range at which the adhesive can be softened to a point of flow while maintaining rigidity of the PCTA. One approach for an adhesive system addressing the need for enhanced adhesion while maintaining a high softening point is to blend the two resins together. The intention is to use the carbon-oxygen double bond functionality found in the EEA to increase the bond strength and to combine it with an LDPE component for higher thermal properties. With as little as 5 weight percent EEA added to prepare a modified LDPE, the resulting thermal adhesive system does not pass the hot plate intrusion test. In addition, at this level of modification the bond strengths are not significantly enhanced.

According to a current understanding of the disclosure, the first property that is important to be imported to the adhesive system is achieving a suitable Vicat softening point of the adhesive system, which is a blend of the respective Vicat temperatures of the components of the adhesive system when it includes more than one component. The adhesive system Vicat softening point typically is relatively close to a suitable glass transition temperature of the polymeric substrate, as discussed herein.

Once the suitable Vicat softening point is achieved, any unsuitable melt flow properties must be overcome. The higher the melt flow, the easier the adhesive will separate. As the temperature of the resin is increased, the resin will flow more easily. If the Vicat softening point is much lower than the glass transition temperature of the polymeric substrate, such as PCTA, the adhesive system can be heated until the resistance to flow is overcome, and the hot plate intrusion test will fail. However, if the Vicat softening point is at or slightly lower than that glass transition temperature of the polymeric substrate, such as PCTA, the adhesive system cannot be heated to overcome the resistance to flow before this glass transition temperature of the polymeric substrate is reached and the entire structure fails, resulting in a success in the hot plate intrusion test.

Therefore, a preferred combination is to provide not only a closeness between the Vicat softening point temperature of the adhesive system and the glass transition temperature of the polymeric substrate but also to formulate the adhesive system such that its Vicat softening point temperature is lower than this Tg of the substrate. Typically, a Vicat value or softening temperature between about 85° C. and about 92° C. for the adhesive system will be satisfactory for use with a typical specialty polyester as discussed herein, such as PCTA. Generally, the Vicat temperature of the adhesive system will be lower than this Tg of the polymeric substrate by 15° C., 10° C., 5° C., 3° C. or 2° C.

Another component of a typically advantageous combination is to incorporate components within the adhesive system that have relatively low melt flow index (MFI) values so the adhesive system MFI is not so high as to exhibit too low of a resistance to flow. A typical MFI value for the adhesive system is 15 grams or less per ten minutes, or 12 grams or less per ten minutes, or 10 grams or less per ten minutes, or 8 grams or less per ten minutes, or 6 grams or less per ten minutes, or 5 grams or less per ten minutes, or 3 grams or less per ten minutes.

The following Examples illustrate certain of the concepts and features that are discussed herein and are not intended as limiting.

Example 1

A comparative Example of a likely candidate that falls short is a dual-blend approach as follows. About 10-15% ethylene ethyl acrylate copolymer or EEA (such as AMPLIFY® EA 101, of Dow Chemical Company, Vicat temperature of 57° C. and MFI of 6 grams per ten minutes) is added to the LDPE (AT418 of AT Polymers) increasing peel strength to itself. The mode of failure was changed by blending these two polymers, from an adhesive failure (separation of the adhesive from the PCTA substrate) to a cohesive failure (separation of the adhesive from the adhesive at the lamination interface), the latter being a desirable effect for the present objectives. However, this dual-blend product fails the hot plate intrusion testing. The weighted average softening point of the bulk adhesive system blend is vastly different from the glass transition temperature of the base substrate, believed to be an important reason that this blend fails the hot plate intrusion testing. Adhesive systems from 5% to 50% by weight EEA were formulated, as little as 5% EEA lowered the thermal properties enough to fail hot plate intrusion testing.

Example 2

In achieving the objectives of the invention by modifying this particular dual blend, a third resin is added to the dual-blend formulation of Example 1 in order to increase functionality and to increase the softening point of the resulting adhesive system. A resin providing these features is a maleic-anhydride modified linear low density polyethylene (MA-LLDPE). A specific sample is EQUISTAR® PLEXAR® PX5125, of Equistar Chemicals, LP, Vicat temperature of 96° C. and MFI of 6 grams per ten minutes. Resins of this type have been found to provide two advantages. First, the maleic-anhydride portion adds some carbon-carbon and carbon-oxygen double bond functionality to the resin matrix, resulting in more potential bonding sites. Second, the MA-LLDPE has a much higher softening point than EEA, namely 96° C., which offsets the decrease in the bulk softening point due to the addition of EEA. A tri-blend approach for this thermal adhesive system that achieves good adhesion while still passing the required intrusion testing is a weight percent blend of 45% LDPE/45% MA-LLDPE/10% EEA blend.

Example 3

A modification of Example 2 shows different effects. A weight percent blend of 50% LDPE/50% MA-LLDPE blend also passes the required intrusion tests, but does not have a bond strength as aggressive as the tri-blend with the 10 weight percent EEA. Also, an adhesive system of a weight percent blend of 42.5%/LDPE/42.5% MA-LLDPE/15%/EEA was not fully effective in achieving the desired objectives. Adding another 5 weight percent EEA to the adhesive resin matrix results in a failure through the hot plate intrusion test.

Still intending not to be bound by any theory, the following observations are made concerning Examples 2 and 3. The EEA in the tri-blend approach increased the bond strength and changed the mode of failure due to the additional chemical functionality. Addition of the MA-LLDPE increased the bulk Vicat softening point to allow for Vicat temperature decrease caused by the inclusion of EEA. However, the bond strength still was not as aggressive as the EEA adhesive, believed to be due to the nature of the majority-constituent material, polyethylene, which is not an aggressive adhesive material.

Example 4

Another resin family is advantageous in meeting objectives of the adhesive system of the invention. These are ethylene acrylic acid (EAA) copolymers. An example is PRIMACOR® 3003, of Dow Chemical Company. This has an unusually high Vicat softening point of 90° C. and an MFI of around 8 grams per ten minutes. The MFI remains within a reasonable working range and does not exhibit excessive yielding during attempts to penetrate the resin while under the heat of intrusion testing. A predecessor, PRIMACOR® 1321, has a Vicat softening point of 89° C. and an even more favorable MFI of 3 grams per ten minutes. While the lower MFI of the discontinued PRIMACOR® 1321 was advantageous, the slightly lower Vicat was less desirable than the current product. When adhesive systems with these resins were coated on the PCTA film and heat sealed, exceptional peel strengths to self were produced, rivaling those of the EEA resin, as well as passing the Polaroid environmental test and hot plate intrusion testing.

Example 5

Adding 10 weight percent EEA (MFI of 6 grams per ten minutes) to the EAA-based adhesive system matrix reduces the Vicat softening point of the system, and this blend failed the hot plate intrusion test. Adding 10 weight percent EMA or ethylene methacrylate copolymer (such as OPTEMA® TC220, of Exxon Mobil Corporation, MFI of 5 grams per ten minutes) to the matrix also reduces the Vicat softening point to such an extent that a sample of this blend failed the hot plate intrusion test. However, adding 10 weight percent of a different EMA (OPTEMA® TC110, of Exxon Mobil Corporation, MFI of 2 grams per ten minutes) to the matrix resulted in passage of the relevant tests. Using the TC110 EMA also reduces cost somewhat compared to the TC220 EMA. It is presently believed that the difference in MFI between these two EMA resins contributes to the better result when the lower-MFI component TC110 EMA is used rather than the TC220 EMA. Table I gives MFI and Vicat values, and Table II shows hot plate intrusion test results for an EEA (EA 101) and for these two EMA sources.

TABLE I

Melt Flow Index and Vicat Softening Point Comparison of Three Resins

|  | EEA (EA 101) | EMA (TC220) | EMA (TC110) |
|---|---|---|---|
| MFI | 6 | 5 | 2 |
| Vicat | 57 | 43 | Approximately 48 |

Example 6

The following further illustrates how melt flow index properties can affect the adhesive system formulation. The formulation having EEA (AMPLIFY® EA 101, of Dow Chemical Company) blended at 10 weight percent into ethylene acrylic acid copolymer, or EAA, which failed the hot plate intrusion test, has a Vicat point of 57° C. and an MFI of 6. The OPTEMA® TC110 EMA at 10 weight percent into EAA, which passed the hot plate intrusion test, has a lower Vicat point but also a lower MFI. It is presently believed that this result can be attributed at least in part to the difference in melt flow between the two resins. Melt flow is a rheological property described as a shear value at a given temperature and force. The OPTEMA® TC110 EMA has a much higher resistance to flow, noted by the lower melt flow index, than does the EEA (AMPLIFY® EA 101 from Dow). Resins having a higher melt flow index, such as the EMA (ethylene methacrylate copolymer adhesive) or EAA (ethyl acrylic acid copolymer). This exemplifies a recognition that the EEA (ethylene ethyl acrylate copolymer adhesive) has a lower resistance to flow. The lower melt flow index (higher flow resistance) is believed to contribute to passing the hot plate intrusion test.

Example 7

It is believed that the resultant melt flow of blended adhesive system materials is not a linear calculation, but rather logarithmic. As such, the melt flow of the blend favors the higher melt flow index value. Even low loadings of drastically different melt flows can have profound effects on the resultant melt flow index of the adhesive system blend. A sample made with 100 weight percent OPTEMA® TC110 EMA as the adhesive system onto the PTCA film will fail the hot plate intrusion test. Since the softening point of the resin and the film substrate have a large window of separation, this adhesive system can be heated to a point where the resistance to flow is low enough to allow for separation. However, when blended with a more flow-resistant resin such as PRIMACOR® 1321 EAA, the window is wider than using EA 101 EEA, but the resin cannot be heated hot enough to overcome the resistance to flow before the entire structure is compromised.

Example 8

Table II includes the test data of adhesive systems that are resins and resin blends. Each adhesive system was extrusion coated onto 0.007 inch (about 0.18 mm) of PTCA film (Eastman A-150 extruded by Pacur, LLC) using 0.003 inch (about 0.076 mm) of the adhesive system resin or resin blend. Samples were then laminated through a TLC pouch laminator set at 300° F. (146° C.) and separated (for the bond tests) in a Lloyd tensiometer.

TABLE II

Test Data for Several Resin Adhesive Systems

|  | LDPE | EEA | LDPE/MA-LLDPE | TriBlend | EAA | EAA/EMA |
|---|---|---|---|---|---|---|
| Peel Strength to Self | 2A | 20C | 3A | 5C | 25C | 20C |
| Peel Strength to Teslin ® | 12T | 12T | 12T | 12T | 12T | 12T |
| Polaroid Environmental Test | Fail | Pass | Pass | Pass | Pass | Pass |
| Hot Plate Intrusion Test | Pass | Fail | Pass | Pass | Pass | Pass |

A—Adhesive Failure, separation between the adhesive and the substrate
C—Cohesive Failure, separation between the adhesive at the laminated interface (preferred failure mode indicating strong bonds to the substrate)
T—Teslin destruction in the "Z" direction The tests of Table II illustrate that the first three columns listed, which are comparative examples, each have an unsatisfactory attribute. The current 100% LDPE resins of the adhesive system of the first column in Table II do not pass the Polaroid environmental test and experience undesirable adhesive failure separation between the adhesive and the substrate. The 100% EEA adhesive system of the second column is generally satisfactory except it failed the hot plate intrusion test. The LDPE/MA-LLDPE (50%/50%) adhesive system of the third column and of Example 3 experienced adhesive failure and not the sought-after cohesive failure.

The tri-blend adhesive system of the fourth column of Table II (and of Example 2) is a weight percent blend of 45% LDPE, 45% MA-LLDPE and 10% EEA. This exhibited the desirable property of peel strength to self or cohesive failure, although its value of 5 is lower than a preferred minimum level of about 10, more preferably about 12 minimum. The EAA adhesive system of the fifth column exhibited peel strength to self of 25. Modifying this blend to 90 weight percent EAA and 10 weight percent EMA as the adhesive system of the sixth column resulted in very satisfactory peel strength to self of 20 while also reducing total cost of the blend. Allowing up to 25 weight percent EMA typically still achieves satisfactory results while further reducing cost.

Examples 9-20

Comparative

Improvement in the functionality of LDPE (Vicat temperature of 90° C. and MFI of 12 grams per ten minutes) by blending same with ethylene-based technology for modifying polyethylenes or polypropylenes (Metallocene 3035, of Exxon Mobil, Vicat temperature of 79° C. and MFI of approximately 4 grams per ten minutes). From 25 to 50 weight percent of polypropylene was combined with the LDPE, but the needed adhesive functionality and successful intrusion testing were not achieved in this Example 9.

Adhesive systems combining LDPE (AT418) with MA/LLDPE resin (AT1000A of Mitsu Admer, Vicat temperature of 99° C. and MFI of approximately 2 grams per ten minutes) were tested in this Example 10. Adhesive systems of 25, 33 and 50 weight percent of MA-LLDPE in the LDPE were formulated. The needed functionality and intrusion testing results were not attained.

Ethylene-hexene copolymer (Exxco 012 of Exxon Mobil, Vicat temperature of 91° C. and MFI of 12 grams per ten minutes) was unsatisfactory to provide both adequate binding functionality and intrusion testing success. This ethylene-hexene copolymer was blended at levels of 25% and 50% by weight with LDPE (AT418). This Example 11 did not achieve the needed combination of properties.

Ethylene elastomer MAH graft (SE810 of Mitsui Admer, Vicat temperature of less than 40° C. and MFI of approximately 7 grams per ten minutes) was combined with AT418, LDPE. The ethylene elastomer added bonding functionality in this Example 12, but the hot plate intrusion resistance was compromised. These adhesive systems contained 15% or 40% by weight ethylene elastomer MAH graft.

Ethylene n-butylacrylate MAH terpolymer (Atofina Lotader 4210, Vicat temperature of 78° C. and MFI of 9 grams per ten minutes) was combined with AT418 LDPE at 15% and 40% by weight of the 4210 in this Example 13. This did not achieve both added adhesive functionality and successful intrusion testing.

Ethylene n-butylacrylate MAH terpolymer (Atofina Lotader 3210, Vicat temperature of 80° C. and MFI of 5 grams per ten minutes) was combined with AT418 LDPE at 15% and 40% by weight of the 3210 in this Example 14. This did not achieve both added adhesive functionality and successful intrusion testing.

Anhydride-modified LDPE (Dupont Bynel 4288, Vicat temperature of 86° C. and MFI of approximately 5 grams per ten minutes) was combined with AT418 LDEE at levels of 15% and 40% by weight of the 4288 in this Example 15. This did not result in satisfactory adhesion functionality and intrusion testing success.

Adhesive-grade polypropylene homopolymer (Philips-Sumika HEX-340, Vicat temperature of 155° C., MFI of approximately 9 grams per ten minutes) was combined at levels of 25% and 35% by weight with AMPLIFY® EA101 EEA of Dow Chemical. This Example 16 was an attempt to raise the Vicat temperature in a known good functionality adhesive (the EEA), but the resultant adhesive system exhibited poor adhesive properties.

EVA (AT Plastics 1061, Vicat temperature of 92° C. and MFI of approximately 2 grams per ten minutes and having a 6 weight percent EVA content) was used as the adhesive system. This Example 17 was not adequate as an adhesive system as described herein.

An LDPE (Voridian 808 P, Vicat temperature of 88° C. and MFI of 7 grams per ten minutes) gave poor adhesion in this Example 18. Combining same with 10% or 20% of HDPE (Dow Chemical DMD-8007, Vicat temperature of 132° C. and MFI of approximately 8 grams per ten minutes) were formulated in an attempt to raise the Vicat temperature. Poor adhesion resulted.

Westlake LDPE was used as a high Vicat adhesive, both EC478 (Vicat temperature of 100° C. and MFI of approximately 5 grams per ten minutes) and EC479 (Vicat temperature of 92° C. and MFI of approximately 6 grams per ten minutes) were tried but found unsatisfactory in this Example 19.

EVA (Dupont ELVAX PE3507-2, Vicat temperature of 90° C. and MFI of about 3 grams per ten minutes and having an EVA content of 6% by weight) was used as the adhesive system. This result adhesive system was not an adequate adhesive in this Example 20.

It will be understood that the embodiments of the present invention which have been described are illustrative of some of the applications of the principles of the present invention. Numerous modifications may be made by those skilled in the art without departing from the true spirit and scope of the invention. Various features which are described herein can be used in any combination and are not limited to procure combinations that are specifically outlined herein.

The invention claimed is:

1. An intrusion resistant thermal laminating film comprising:
    (a) a self-supporting polymeric substrate having a glass transition temperature of not greater than about 95° C., and the polymeric substrate is selected from the group consisting of a polycyclohexylenedimethylene terephthalate (PCTA), glycol-modified polycyclohexylenedimethylene terephthalate (PCTg), and combinations thereof;
    (b) a thermal adhesive system adhered to said polymeric substrate to form an intrusion resistant thermal laminating film, said adhesive system comprising a blend of one or more alkyl acrylate or alkyl acrylic acid copolymers selected from the group consisting of ethylene acrylic acid (EAA), ethylene methacrylate (EMA) and combinations thereof; and one or more low density polyethylenes, said adhesive system having a Vicat softening point that is below the polymeric substrate glass transition temperature and between about 80° C. and 95° C., said adhesive system having a melt flow index (MFI) of about 15 grams or less per ten minutes; and
    (c) the intrusion resistant thermal laminating film maintains adhesion between the adhesive system and the polymeric substrate and achieves cohesive failure of the adhesive system upon subjecting the intrusion resistant thermal laminating film to an elevated temperature below the polymeric substrate glass transition temperature.

2. The film of claim 1, wherein said polymeric substrate is transparent and amorphous.

3. The film of claim 1, wherein the Vicat softening point is within 15° C. of said glass transition temperature.

4. The film of claim 1, wherein the Vicat softening point is within 10° C. of said glass transition temperature.

5. The film of claim 1, wherein the Vicat softening point is within 5° C. of said glass transition temperature.

6. The film of claim 1, wherein the Vicat softening point is within 3° C. of said glass transition temperature.

7. The film of claim 1, wherein said adhesive system has a melt flow index (MFI) of about 12 grams or less per ten minutes.

8. The film of claim 1, wherein said adhesive system has a melt flow index (MFI) of about 10 grams or less per ten minutes.

9. The film of claim 1, wherein said adhesive system has a melt flow index (MFI) of about 5 grams or less per ten minutes.

10. The film of claim 1, wherein said cohesive failure of the adhesive system is about 5 or greater.

11. The film of claim 1, wherein said cohesive failure of the adhesive system is about 10 or greater.

12. The film of claim 1, wherein said cohesive failure of the adhesive system is about 12 or greater.

13. The film of claim 1, wherein said low density polyethylene is selected from the group consisting of maleic anhydride modified linear low density polyethylene (MA-LLDPE), low density polyethylene (LDPE) and combinations thereof.

14. An intrusion resistant thermal laminating film comprising:
    (a) a self-supporting polymeric substrate having a glass transition temperature of not greater than about 95° C., the polymeric substrate being selected from the group consisting of a polycyclohexylenedimethylene terephthalate (PCTA), glycol-modified polycyclohexylenedimethylene terephthalate (PCTg), and combinations thereof;
    (b) a thermal adhesive system adhered to said polymeric substrate to form an intrusion resistant thermal laminating film, said adhesive system comprising a blend of one or more alkyl acrylate or alkyl acrylic acid copolymers selected from the group consisting of ethylene acrylic acid (EAA), ethylene methacrylate (EMA) and combinations thereof; and one or more low density polyethylenes, said adhesive system having a Vicat softening point that is below the polymeric substrate glass transition temperature and between about 80° C. and 95° C., said adhesive system having a melt flow index (MFI) of about 15 grams or less per ten minutes;

(c) the intrusion resistant thermal laminating film maintains adhesion between the adhesive system and the polymeric substrate and achieves cohesive failure of the adhesive system upon subjecting the intrusion resistant thermal laminating film to an elevated temperature below the polymeric substrate glass transition temperature; and wherein said thermal adhesive system comprises between about 75 weight percent and about 100 weight percent ethylene acrylic acid (EAA) and up to about 25 weight percent of ethylene methacrylate (EMA) copolymer, based on the total weight of the alkyl acrylate or alkyl acrylic acid copolymer.

15. The intrusion resistant thermal laminating film of claim 14, wherein the thermal adhesive system comprises about 90 weight percent of said ethylene acrylic acid (EAA) and about 10 weight percent of said ethylene methacrylate (EMA), based on the total weight of the alkyl acrylate or alkyl acrylic acid copolymer.

* * * * *